US009729750B2

(12) United States Patent
Yamamuro (10) Patent No.: US 9,729,750 B2
(45) Date of Patent: Aug. 8, 2017

(54) INFORMATION PROCESSING APPARATUS, INFORMATION PROCESSING METHOD, AND MEDIUM (71) Applicant: CANON KABUSHIKI KAISHA, Tokyo (JP)

(72) Inventor: Soichi Yamamuro, Irvine, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 14/573,048

(22) Filed: Dec. 17, 2014

(65) Prior Publication Data
US 2015/0193171 A1 Jul. 9, 2015

(30) Foreign Application Priority Data

Jan. 7, 2014 (JP) .................................. 2014-001033

(51) Int. Cl.
G06F 3/06 (2006.01)
H04N 1/21 (2006.01)

(52) U.S. Cl.
CPC .............. *H04N 1/21* (2013.01); *G06F 3/061* (2013.01); *G06F 3/0655* (2013.01); *G06F 3/0673* (2013.01); *H04N 1/2158* (2013.01); H04N 2201/0094 (2013.01); H04N 2201/216 (2013.01)

(58) Field of Classification Search
CPC ....... G06F 3/0655; G06F 3/061; G06F 3/0673
See application file for complete search history.

(56) References Cited

U.S. PATENT DOCUMENTS

| 7,038,991 B1* | 5/2006 | Spruit ................ G11B 20/1217 369/275.3 |
| 7,711,863 B2* | 5/2010 | Matton ................ G06F 9/4411 710/10 |
| 7,856,491 B2 | 12/2010 | Kamata et al. |
| 2004/0039827 A1* | 2/2004 | Thomas .................. H04L 29/06 709/228 |
| 2007/0198649 A1* | 8/2007 | Kamata ................ G06F 9/4411 709/207 |
| 2008/0005471 A1* | 1/2008 | Ma ....................... G06F 12/0246 711/115 |

(Continued)

FOREIGN PATENT DOCUMENTS

JP 2007-219969 A 8/2007

*Primary Examiner* — Henry Tsai
*Assistant Examiner* — John Roche
(74) *Attorney, Agent, or Firm* — Fitzpatrick, Cella, Harper & Scinto (57) ABSTRACT Provided is an information processing apparatus communicable with a storage control device that causes a storage medium to store data. The information processing apparatus includes: a reading unit configured to read the data from the storage medium; a receiving unit configured to receive a completion notification from the storage control device in a case where the storage control device causes the storage medium to store the data; and a control unit configured to control the reading unit to change a state in which reading by the reading unit is limited into a state in which limitation of the reading is released, in a case where the receiving unit receives the completion notification. The reading unit reads the data from the storage medium under a condition where the control unit releases the limitation.

19 Claims, 6 Drawing Sheets (56) References Cited

U.S. PATENT DOCUMENTS

| | | | |
|---|---|---|---|
| 2008/0222734 A1* | 9/2008 | Redlich | G06F 21/577 726/26 |
| 2010/0031250 A1* | 2/2010 | Hasegawa | G06F 9/4411 717/174 |
| 2012/0054381 A1* | 3/2012 | Craddock | G06F 13/28 710/28 |
| 2013/0154916 A1* | 6/2013 | Ramaswamy | G06Q 10/0633 345/156 |

\* cited by examiner

INFORMATION PROCESSING APPARATUS, INFORMATION PROCESSING METHOD, AND MEDIUM

BACKGROUND OF THE INVENTION

Field of the Invention

The present invention relates to an information processing apparatus for reading data from a storage medium, an information processing method, and a medium.

Description of the Related Art

There is an image input device such as a digital camera or a multifunction printer with a scanner function (herein abbreviated as "MFP") including an internal memory or an attachable/detachable external memory, which is capable of reading and writing image data. The image input device may be connected via an interface to an information processing apparatus so that data in the memory of the image input device is displayed on the information processing apparatus. Japanese Patent Laid-Open No. 2007-219969 discloses the technology of reading out image data at the time when the information processing apparatus side senses notification indicating that communication between the memory and the information processing apparatus is enabled.

However, the conventional technology as described above has a problem in that in a case where the image input device performs new scanning or photographing and consequently creates an image and retains the image in the memory, the image cannot be immediately reflected on the display of the information processing apparatus side.

SUMMARY OF THE INVENTION

The present invention has been made in view of the foregoing problem. An object of the present invention is to provide an information processing apparatus, an information processing method and a medium capable of properly reading data in a case where the data is stored in a storage medium.

In order to solve the foregoing problem, the present invention provides an information processing apparatus communicable with a storage control device that causes a storage medium to store data, including: a reading unit configured to read the data from the storage medium attached to the storage control device; a receiving unit configured to receive a completion notification corresponding to completion of storage of the data from the storage control device in a case where the storage control device causes the storage medium to store the data; and a control unit configured to control the reading unit to change a state in which reading by the reading unit is limited into a state in which limitation of the reading is released, in a case where the receiving unit receives the completion notification, in which the reading unit reads the data from the storage medium under a condition where the control unit releases the limitation.

According to the present invention, in a case of the completion of the storage of data in the storage medium, the control unit changes the state in which the reading of the data from the storage medium is limited into the state in which the limitation of the reading is released, and the data is read from the storage medium under the condition where the limitation is released. Thus, the data can be properly read.

Further features of the present invention will become apparent from the following description of exemplary embodiments (with reference to the attached drawings).

DESCRIPTION OF THE EMBODIMENTS

Preferred embodiments of the present invention will be described in detail below with reference to the accompanying drawings. Note that the following embodiments are not intended to restrict the contents recited in the claims of the present application, and all combinations of features described in the following embodiments are not limited to being indispensable as means of the present invention for solving the problem.

Embodiment 1

A configuration of a system according to Embodiment 1 will be described with reference to a block diagram of FIG. 1. In Embodiment 1, an MFP device 100 is used as an image input device. The MFP device 100 includes an operation unit 101 including a display, an input key and a touch panel, a ROM 102 (read only memory) storing a control program of the device, a RAM 103 (random access memory) for use in execution of the control program, and a CPU (central processing unit) controller 104 to control the overall device. Also, the MFP device 100 includes a scanner unit 105 configured to optically read an original as a reading object and capture the original as digital image data, a printer unit 106 configured to perform image printing, and an external card slot 107 for insertion and withdrawal of a memory card 108. The memory card 108 can retain the image data or the like. Further, the MFP device 100 includes an interface unit 109 configured to connect the device to an external information processing apparatus to enable communication between the device and the apparatus. In such a configuration, an operation for creating a new image file and retaining the image file in the memory by a local operation in the device, which the present invention is based on, refers to the following operation. Specifically, under a command via the operation unit 101, the scanner unit 105 is used to optically read an original image, resultant image data is converted on the RAM 103 into a file in a file format such as a known jpg format, and the file is stored on the memory card 108.

Hereinafter, this operation will be called "Scan To Memory" (herein abbreviated as S.T.M.).

The information processing apparatus according to Embodiment 1 refers specifically to a computer. As illustrated in FIG. 1, a computer 110 includes a monitor 111 for display of the operation unit, a keyboard 112 for keying, a mouse 113, and a CPU controller 114 to control the overall computer. Also, the computer 110 includes a hard disk (abbreviated as HD) 115 storing an OS 116 (operating system) and a program 117 for control of the MFP device 100 and a RAM 118 for use in execution of the OS 116 or the device control program 117. Further, the computer 110 includes an interface unit 119 configured to connect the computer 110 to the MFP device 100 to enable communication between the computer 110 and the MFP device 100.

Next, specific processing in the above-described system configuration will be described, taking as an example a case where an interface for connection between the MFP device 100 and the computer 110 is in the form of known USB (Universal Serial Bus).

Figure 2:
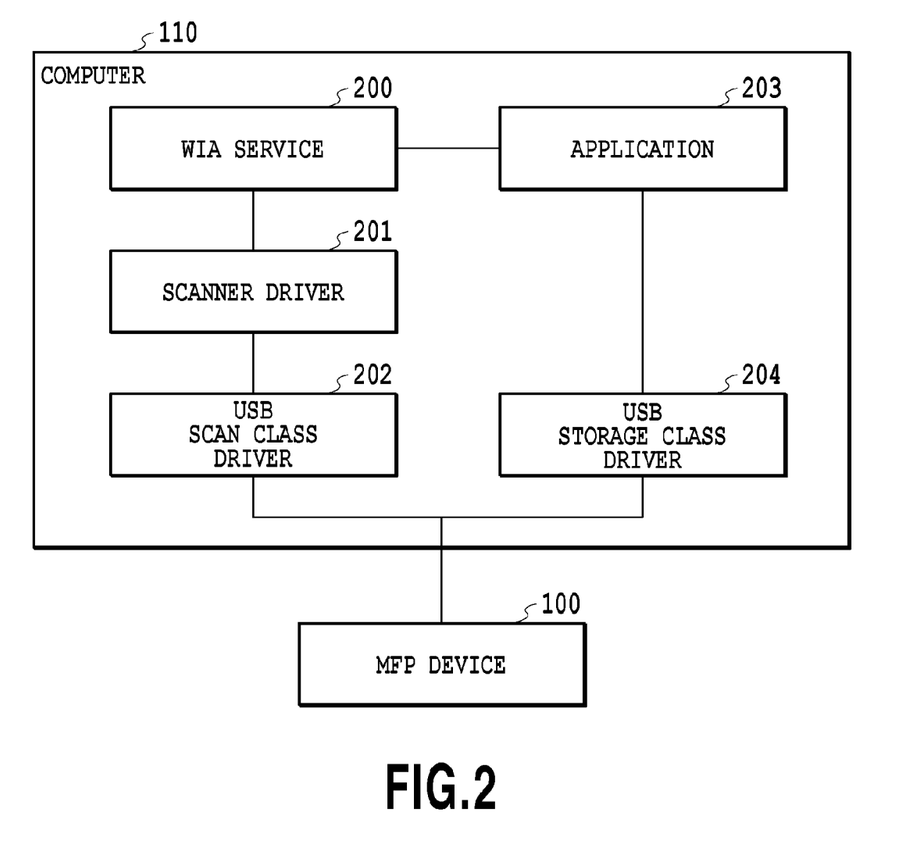
FIG. 2 is a block diagram illustrating a software configuration in the computer according to Embodiment 1 (in a case of USB connection)

FIG. 2 illustrates a configuration of software to be executed in the RAM 118 in the computer 110 connected to the MFP device 100 via the USB. Programs corresponding to plural pieces of software indicated by reference numerals 200 to 204 in FIG. 2 are stored in the HD 115, and functions of the plural pieces of software 200 to 204 can be implemented by the CPU controller 114 executing the programs.

In FIG. 2, the computer 110 and the MFP device 100 are connected together using software logic in a USB composite form. Specifically, the memory card 108 inserted in the external card slot 107 of the MFP device 100 is assigned as a USB storage class. For example, in the Windows (registered trademark) OS, the system is accessible via the existing USB storage class driver 204. Therefore, on the application 203, image data in the memory card 108 is readable via the USB storage class driver 204. The read image data is displayed on the application 203 as icons 603, 604 a UI (user interface) dialog 600 in FIG. 6A. A folder in the memory card is displayed on a left side 601 of the UI dialog, and an icon of the existing image data present in the folder selected there is displayed on a right side 602.

A unit configured for the computer 110 side to receive information notification from the MFP device 100 can be implemented by the USB scan class driver 202. For example, in the Windows (registered trademark) OS, arbitrary event notification is executable via the USB scan class driver 202, and the use of the USB scan class driver 202 enables notification of information on the event. Also, the event notification can be provided to the application 203 via the scanner driver 201 and the WIA service 200 as a Windows (registered trademark) module.

Next, description will be given with reference to a flowchart of FIG. 4 with regard to a flow of processing in the system formed of the MFP device 100 and the computer 110 connected via the USB, described above. A program corresponding to the processing in the flowchart illustrated in FIG. 4 or FIG. 5 to be described later is stored in the ROM 102 of the MFP device or the HD 115 of the computer 110. The CPU controller 104 of the MFP device 100 and the CPU controller 114 of the computer 110 can execute the above-described program to implement the processing by the MFP device 100 and the computer 110 in the flowcharts of FIGS. 4 and 5.

In a case where the MFP device 100 receives a user command to start "Scan To Memory" from the operation unit 101 (at step S402), the MFP device 100 sends an "S.T.M." start notification 404 to the computer 110 (at step S403). The sent "S.T.M." start notification 404 indicates the start of "Scan To Memory." The "S.T.M." start notification 404 is sent to the application 203 via the USB scan class driver 202, the scanner driver 201 and the WIA service 200 in the computer 110. In a case where the application 203 receives the "S.T.M." start notification 404, access to the memory card 108 from the application UI 600 is inhibited (at step S412).

On the MFP device 100 side, "Scan To Memory" is started (at step S405). As a result, image data read from an original on the scanner unit 105 is created as an image file for example in a jpg format, and the image file is retained in the memory card 108 (at step S406). At this time, even in a case where jpg files are created from a plurality of originals or one jpeg file is created from an original, the object and advantageous effects of the present invention remain the same. Upon completion of "Scan To Memory" (at step S407), the MFP device 100 sends an "S.T.M." completion notification 409 to the computer 110 (at step S408). The "S.T.M." completion notification 409 is transmitted to the application 203 via the USB scan class driver 202.

In a case where the application 203 receives the "S.T.M." completion notification 409, the inhibition of the access to the memory card 108 from the application UI 600 set at step S412 is released (or a state returns to an access permitted state) (at step S413). By steps S412 and S413, during execution of "Scan To Memory," the access to the memory card 108 from the application 203 is disabled. For example, in a case where the computer 110 accesses the memory card 108 in a process in which "Scan To Memory" is executed and the file is created in the memory card 108, the file in the memory card 108 may become damaged. In Embodiment 1, access limitation as described above is performed, and thus, such damage to the file can be avoided.

Figure 6A:
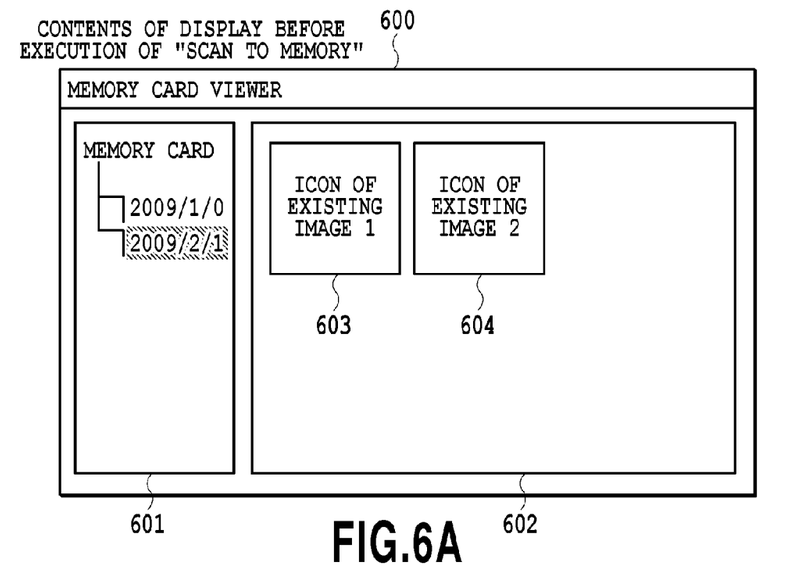
FIG. 6A is a representation of an example of a UI operation of an application 203 according to the present invention.

Then, the application 203 uses a Windows (registered trademark) application program interface (hereinafter called API) function to temporarily disable the USB storage class driver 204 and again return the USB storage class driver 204 to an enabled state (at step S414). This enables the application 203 to read new data in the USB storage device. Also, in Embodiment 1, in a case where the USB storage class driver 204 is changed from a disabled state to the enabled state, the computer 110 automatically reads the data in the USB storage device even in the absence of a user command. Therefore, all image data files in the folder of the memory card 108 selected on the left side 601 of the UI dialog 600 of the application 203 are read via the USB storage class driver 204 (at step S415). This enables refreshing display and displaying new image data on the right side 602 of the UI dialog 600 using an icon. This display method, although it includes several approaches, may, for example, involve creating a thumbnail image on the application 203, based on the read image data file, and displaying the thumbnail image as an icon. Alternatively, a general method for displaying an image file present in an external storage region, such as display a file name by which the image file is uniquely specified, may be used. In a case where a thumbnail image or a file name is thus transmitted to the computer 110, a smaller amount of data can be transmitted to notify the computer 110 that the image data is stored on the memory card 108, as compared to a case where the image data is transmitted as it is.

Figure 6B:
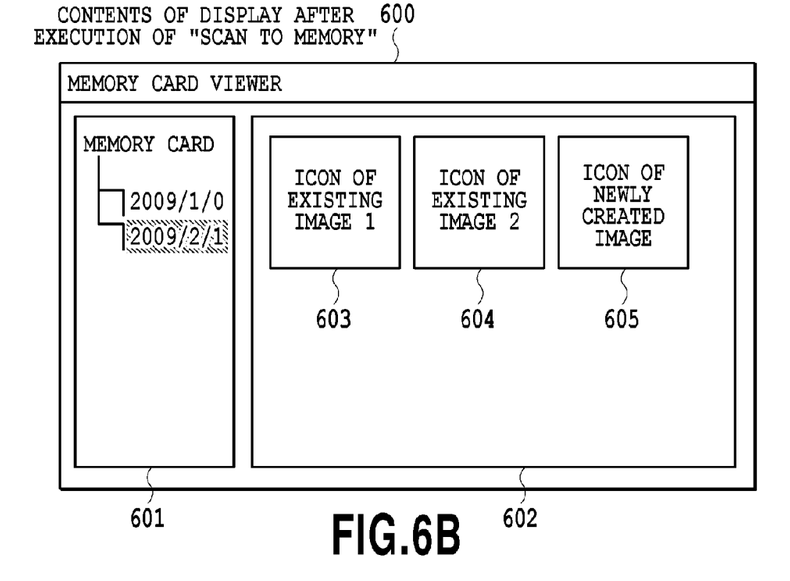
FIG. 6B is a representation of an example of a UI operation of an application 203 according to the present invention.

According to Embodiment 1, as illustrated in FIG. 6B, in a case where "Scan To Memory" is executed to create the image data, icons of all files also including an icon 605 of the image data are immediately displayed. Therefore, for example after the execution of "Scan To Memory," the icon 605 of the image data can be automatically displayed even if a user does not operate the computer 110 to refresh the display. Also, "Scan To Memory" is executed to store the image data on the memory card 108, and thus, according to Embodiment 1, information on the image data can be transmitted to both the memory card 108 and the computer 110.

In Embodiment 1, in a case where the MFP device 100 executes "Scan To Memory," the computer 110 mainly reads image data. Thus, the MFP device 100 does not need to mainly transmit the image data to both the memory card 108 and the computer 110. Therefore, as described above, the processing is divided between the computer 110 and the MFP device 100 thereby to enable reducing a processing load on the MFP device.

Embodiment 2

Embodiment 1 presents the approach of executing the disabling and enabling of the USB storage device by using the API function, as a method for enabling the application 203 to read new data in the USB storage device. Embodiment 2 presents the approach of executing the writing and deletion of a dummy file from the application 203 to the USB storage, as the method for enabling the application 203 to read new data in the USB storage device. In Embodiment 2, in a case where at least one of the writing and deletion of data to and from the USB storage device is performed, the computer 110 automatically reads data in the USB storage device even in the absence of a user command. Thus, at step S414 of FIG. 4, in a case where the application 203 executes the writing and deletion of a dummy file to and from the USB storage, new data in the USB storage device is automatically read.

Since the remaining configuration is the same as that of Embodiment 1, detailed description will be omitted. Embodiment 2 also enables reading new data in the USB storage device. Therefore, as illustrated in FIG. 6B, in a case where "Scan To Memory" is executed to create image data, icons of all files also including the icon 605 of the image data are immediately displayed.

Embodiment 3

Figure 4:
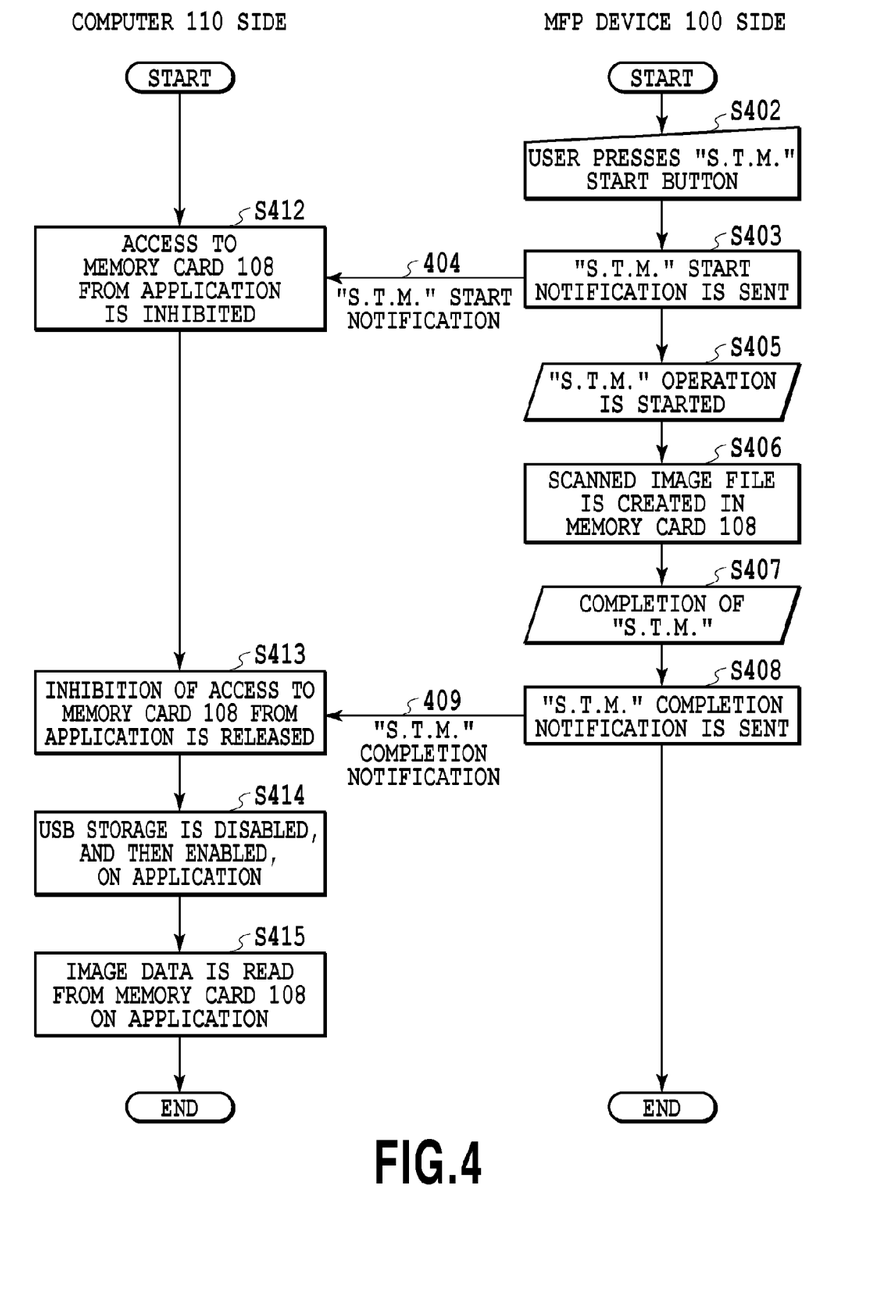
FIG. 4 is a flowchart illustrating a flow of processing according to Embodiment 1 (in a case of USB connection)

Embodiment 1 presents an example in which, according to the flowchart of FIG. 4, upon completion of "Scan To Memory" (at step S407), the MFP device 100 sends the "S.T.M." completion notification 409 to the computer 110 (at step S408). In Embodiment 3, before the completion of "Scan To Memory," a completion notification indicating the completion of operation in the process of being performed is sent several times at regular intervals, for example in the process of scanning. Since a system configuration according to Embodiment 3 is the same as that in Embodiment 1, description will be omitted. (Refer to FIGS. 1 and 2.)

Specifically, in a case where the MFP device 100 retains image data read by the scanner unit 105 by "Scan To Memory" operation, in the memory card 108, the image data in the process of being read is stepwise retained as a file in the RAM 103. At this time, each time the image data is stepwise retained as the file, the MFP device 100 sends a completion notification to the computer 110. Then, each time the application 203 receives the completion notification, the disabling and enabling of the USB storage device are executed as described in Embodiment 1. Since the remaining configuration is the same as that of Embodiment 1, detailed description will be omitted.

According to Embodiment 3, display of the icon 605 of the file is stepwise refreshed in sequence, and thus, the information processing apparatus side can see a status of image scanning at any time. This enables the user to grasp the status of image scanning in the process of being performed.

Embodiment 4

Figure 1:
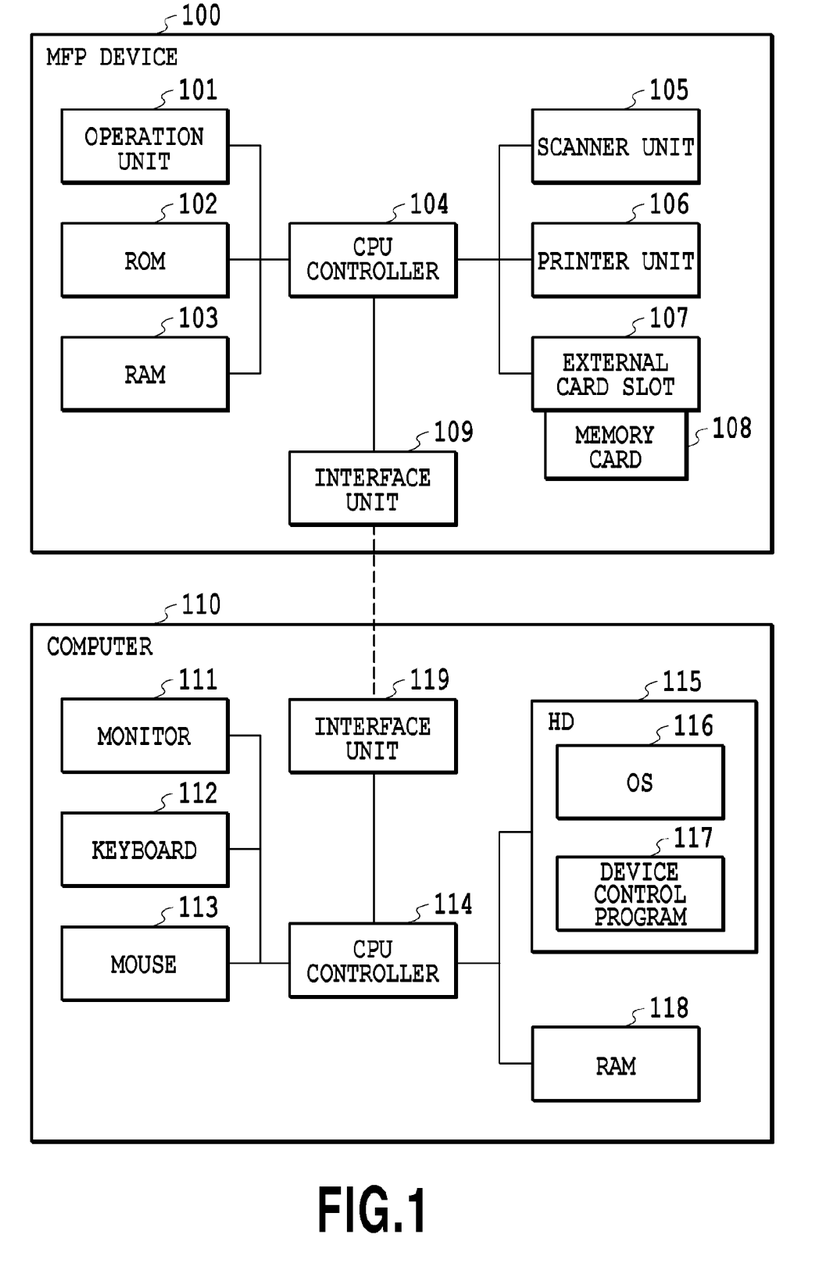
FIG. 1 is a block diagram illustrating a configuration formed of an MFP and a computer according to the present invention.

Next, description will be given, taking as an example a case where an interface for connection between the MFP device 100 and the computer 110 of the system configuration illustrated in FIG. 1 is in the form of LAN (local area network).

Figure 3:
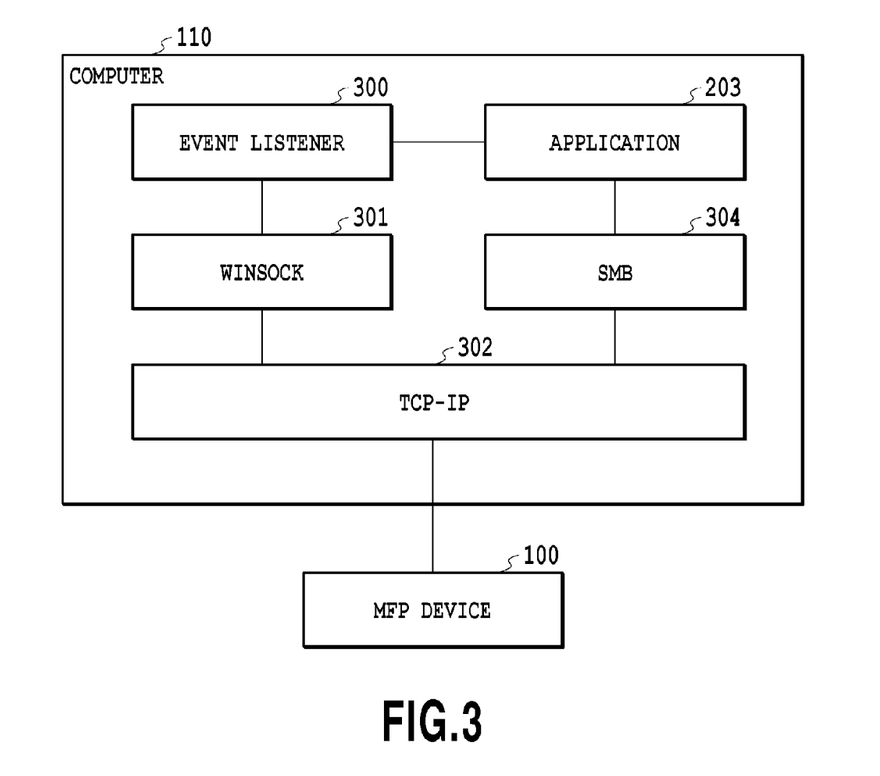
FIG. 3 is a block diagram illustrating a software configuration in the computer according to Embodiment 4 (in a case of LAN connection)

FIG. 3 illustrates a configuration of software to be executed in the RAM 118 in the computer 110 connected to the MFP device 100 via the LAN. In this case, communication between the computer 110 and the MFP device 100 is executed utilizing known TCP/IP 302 (Transmission Control Protocol/Internet Protocol). The computer 110 can access the memory card 108 inserted in the external card slot 107 of the MFP device 100, for example by using known SMB protocol enabling implementation of file sharing on a network. SMB is an abbreviation of Server Message Block. Thereby, on the application 203, under control of SMB 304, image data in the memory card 108 can be read. The read image data is displayed as the icons 603, 604 in the UI dialog 600 of the application 203 illustrated in FIG. 6A. A folder is displayed on the left side 601 of the UI dialog, and an icon of the image data in the selected folder is displayed on the right side 602, as is the case with Embodiment 1.

An application 300 (hereinafter called "event listener" for sake of convenience) developed for example by using Winsock 301 as the known API function is prepared as a means by which the computer 110 side receives information notification from the MFP device 100. Thereby, a command to collect information is sent to the MFP device 100 at regular intervals, and, upon receipt of the command, the MFP device 100 can contain information to be notified in a response to the command. Also, the event listener 300 is the application, and thus, the information notification obtained from the MFP device 100 can be easily transmitted to the application 203.

Figure 5:
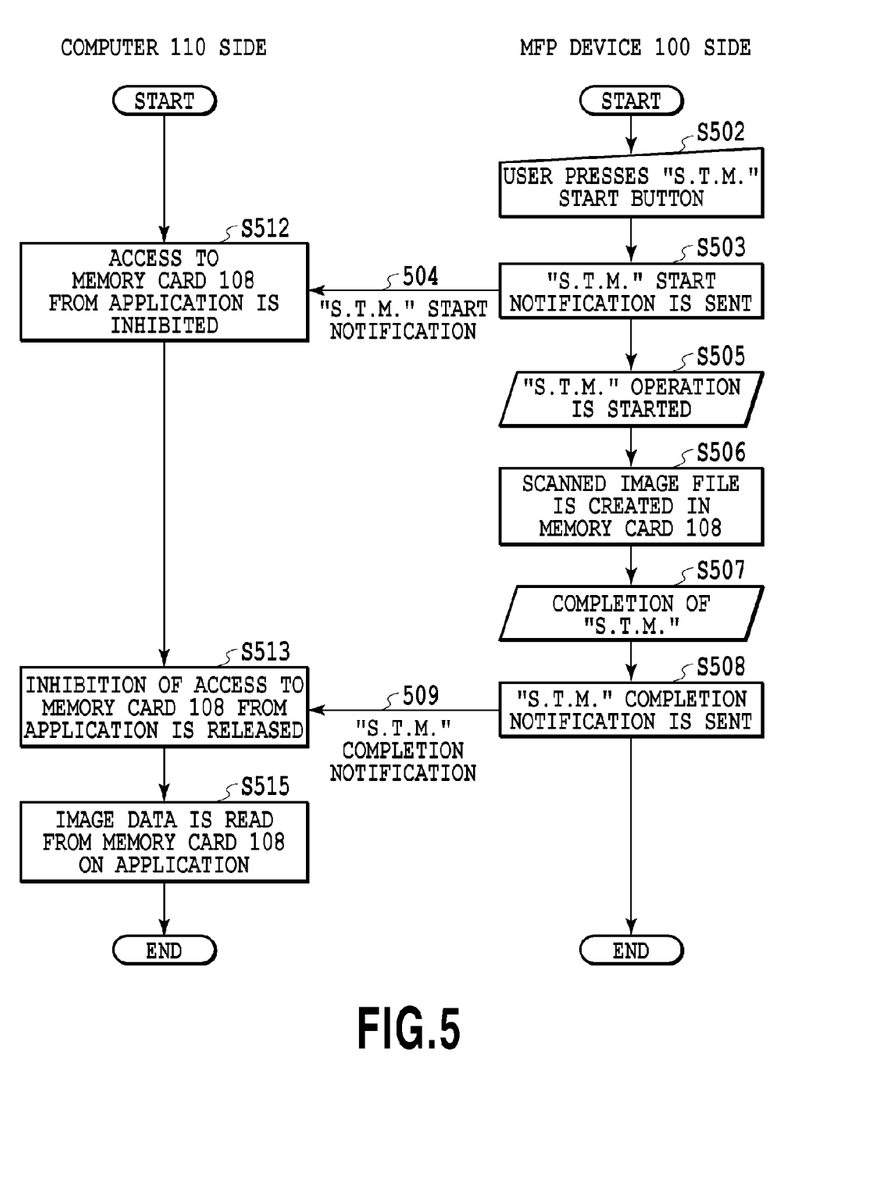
FIG. 5 is a flowchart illustrating a flow of processing according to Embodiment 4 (in a case of LAN connection)

Description will be given with reference to a flowchart of FIG. 5 with regard to a flow of processing in the system formed of the MFP device 100 and the computer 110 connected via the LAN, described above.

In a case where the MFP device 100 receives a user command to start "Scan To Memory" from the operation unit 101 (at step S502), the MFP device 100 sends an "S.T.M." start notification 504 indicating the start of "Scan To Memory" to the computer 110 (at step S503). The "S.T.M." start notification 504 is sent as a response to a command to collect information from the event listener 300, and is sent to the application 203 in the computer 110. In a case where the application 203 receives the "S.T.M." start notification 504, access to the memory card 108 from the application UI 600 is inhibited (at step S512). On the MFP device 100 side, "Scan To Memory" is started (at step S505). As a result of "Scan To Memory," image data read from an original on the scanner unit 105 is created as an image file for example in an existing jpg format, and the image file is retained in the memory card 108 (at step S506). At this time, even in a case where jpg files are created from a plurality of originals or one jpeg file is created from an original, the object and advantageous effects of the present invention remain the same. Upon completion of "Scan To Memory"

(at step S507), the MFP device 100 sends an "S.T.M." completion notification 509 to the computer 110 (at step S508). The "S.T.M." completion notification 509 is the response to the information collection command from the event listener 300, containing information indicating the completion of "Scan To Memory," as is the case with the "S.T.M." start notification 504. In a case where the application 203 receives the "S.T.M." completion notification 509, the inhibition of the access to the memory card 108 from the application UI 600 set at step S512 is released (or a state returns to an access permitted state) (at step S513). By steps S512 and S513, during execution of "Scan To Memory," the access to the memory card 108 from the application 203 is disabled, and damage to the file in the memory card 108 can be avoided. In the processing of FIG. 5, in a case where limitation of the access to the memory card 108 is released, even in the absence of a user command, the access to the memory card 108 is automatically made and the data in the memory card 108 is read. Therefore, all image data files in the folder of the memory card 108 selected on the left side 601 on the UI of the application 203 are read via the SMB 304 (at step S515), and thereby, icons of the image data are displayed again on the right side 602 on the UI.

According to Embodiment 4, as illustrated in FIG. 6B, in a case where "Scan To Memory" is executed to create image data, icons of all files also including the icon 605 of the image data are immediately displayed.

Embodiment 5

In the above-mentioned embodiments, description has been given, taking as an example a case where the image input device and the information processing apparatus are connected via the interface through the USB or the LAN. However, other connection forms may be used in place of the USB or the LAN, provided that data communication such as information notification or access to image data in the memory of the image input device from the information processing apparatus can be performed between the image input device and information processing apparatus.

Embodiment 6

In the above-mentioned embodiments, description has been given, taking as an example a case where the memory card such as an SD card is used as the attachable/detachable external memory on the image input device. However, the external memory in the above-mentioned embodiments may be replaced by an internal memory such as a built-in hard disk. The present invention may be applied to a configuration in which the contents of the internal memory of the image input device are displayed on the information processing apparatus.

Embodiment 7

In the above-mentioned embodiments, description has been given, taking as an example a case where the MFP device is used as the image input device; however, the present invention may also be applied to a case where a device other than the MFP device is used as the image input device. Specifically, the object of the present invention can be attained by using the same flow as that described above, provided that the device is a device capable of creating image data therein, forming the created image data as a file and retaining the file in the memory (for example, a single function scanner, a digital camera, or the like).

For example, in a case where the digital camera is used in place of the MFP device, new image data is created by a photographing function of the digital camera rather than the above-mentioned "Scan To Memory" function. The photographed new image data is retained in a memory of the digital camera in a file format according to specifications, and thereafter, display on the information processing apparatus is automatically updated. Besides, the present invention may be applied to a case where image data is read out from a memory card attached to a printer.

For example, in a case where the computer is connected via the USB to the above-described various devices, the USB class driver for control of the various devices receives notifications of the start and completion of storage on the memory card. Then, the USB storage class driver executes the reading of image data from the memory card.

Further, the storage medium which data is stored on and read from is not limited to a storage medium attached to the device but may be a storage medium connected to the device via the interface such as the USB, or a storage device included in the device.

Also, data to be stored in the memory and transmitted is not limited to image data, and, in a case where various data are stored in the memory, information on the data may be transmitted to the computer 110. Specifically, under the condition that various data are stored in the above-described memory, the computer 110 is notified of the storage of the data, and the computer 110 may read out the information on the various data from the memory.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-001033, filed Jan. 7, 2014, which is hereby incorporated by reference wherein in its entirety.

What is claimed is:

1. An information processing apparatus comprising at least one CPU controller and at least one memory, wherein the information processing apparatus is communicable with a storage control device that causes a storage medium to store data, the at least one CPU controller, according to a program stored in the at least one memory, configured to function as:
   a reading unit configured to read the data from the storage medium attached to the storage control device;
   a completion notification receiving unit configured to receive a completion notification corresponding to completion of storage of the data from the storage control device in a case where the storage control device causes the storage medium to store the data;
   a progress notification receiving unit configured to receive, from the storage control device, a progress notification indicating that a process for storing the data is halfway done before receiving the completion notification in a case where the storage control device causes the storage medium to store the data; and
   a control unit configured to control the reading unit to change a state in which reading by the reading unit is limited into a state in which limitation of the reading is released, in a case where the completion notification receiving unit receives the completion notification or in a case where the progress notification receiving unit receives the progress notification,
   wherein the reading unit accesses the storage medium in response to release of the limitation and automatically reads the data from the storage medium.

2. The information processing apparatus according to claim 1, wherein the information processing apparatus is connected to the storage control device via USB (Universal Serial Bus), and receipt of the completion notification by the completion notification receiving unit or receipt of the progress notification by the progress notification receiving unit is implemented using a driver corresponding to a USB class of the storage control device.

3. The information processing apparatus according to claim 2, wherein the reading by the reading unit is implemented using a USB storage class driver.

4. The information processing apparatus according to claim 3, wherein the control unit executes disabling and enabling of the USB storage class driver thereby to change the state in which the reading by the reading unit is limited into the state in which the limitation of the reading is released.

5. The information processing apparatus according to claim 2, wherein the control unit executes writing of a dummy file to the storage medium thereby to change the state in which the reading by the reading unit is limited into the state in which the limitation of the reading is released.

6. An information processing method to be executed by an information processing apparatus communicable with a storage control device that causes a storage medium to store data, comprising:
   a reading step of reading the data from the storage medium attached to the storage control device;
   a completion notification receiving step of receiving a completion notification corresponding to completion of storage of the data from the storage control device in a case where the storage control device causes the storage medium to store the data;
   a progress notification receiving step of receiving, from the storage control device, a progress notification indicating that a process for storing the data is halfway done before receiving the completion notification in a case where the storage control device causes the storage medium to store the data; and
   a controlling step of controlling to change a state in which reading in the reading step is limited into a state in which limitation of the reading is released, in a case where the completion notification is received in the completion notification receiving step or in a case where the progress notification is received in the progress notification receiving step,
   wherein in the reading step, the storage medium is accessed in response to release of the limitation and the data is automatically read from the storage medium.

7. The information processing method according to claim 6, wherein the information processing apparatus is connected to the storage control device via USB (Universal Serial Bus), and receipt of the completion notification in the completion notification receiving step or receipt of the progress notification in the progress notification receiving step is executed using a driver corresponding to a USB class of the storage control device.

8. The information processing method according to claim 7, wherein the reading in the reading step is executed using a USB storage class driver.

9. The information processing method according to claim 8, wherein disabling and enabling of the USB storage class driver are executed in the control step thereby to change the state in which the reading in the reading step is limited into the state in which the limitation of the reading is released.

10. The information processing method according to claim 7, wherein writing of a dummy file to the storage medium is executed in the control step thereby to change the state in which the reading in the reading step is limited into the state in which the limitation of the reading is released.

11. A non-transitory computer readable storage medium storing a program to cause a computer to execute the information processing method according to claim 6.

12. The information processing apparatus according to claim 1, wherein the reading unit obtains at least one of the data stored in the storage medium and information about the data stored in the storage medium by accessing the storage medium in response to release of the limitation and automatically reading from the storage medium.

13. The information processing apparatus according to claim 12, wherein the information about the data stored in the storage medium includes a thumbnail of the data stored in the storage medium and a file name of the data stored in the storage medium.

14. The information processing apparatus according to claim 1, wherein the reading unit is implemented by using a USB storage class driver,
   each time the progress notification receiving unit receives the progress notification, the control unit controls the reading unit to change a state in which the reading by the reading unit is limited into a state in which limitation of the reading is released by executing enabling of the USB storage class driver and then controls the reading unit to change a state in which limitation of the reading is released into a state in which the reading by the reading unit is limited by executing disabling of the USB storage class driver, and the control unit controls the reading unit to change a state in which the reading by the reading unit is limited into a state in which limitation of the reading is released by executing enabling of the USB storage class driver the disabling of which has been executed in a case where the completion notification receiving unit receives the completion notification.

15. The information processing apparatus according to claim 1, wherein the information processing apparatus is connected to the storage control device via a LAN,
   the reading unit is implemented by using SMB (Service Message Block), and
   the completion notification receiving unit is implemented by using an event listener which is an application developed by using Winsock which is an API function.

16. The information processing method according to claim 6, wherein the reading step obtains at least one of the data stored in the storage medium and information about the data stored in the storage medium by accessing the storage medium in response to release of the limitation and automatically reading from the storage medium.

17. The information processing method according to claim 16, wherein the information about the data stored in the storage medium includes a thumbnail of the data stored in the storage medium and a file name of the data stored in the storage medium.

18. The information processing method according to claim 6, wherein the reading step is implemented by using a USB storage class driver,
   each time the progress notification is received, the controlling step controls the reading step to change a state in which the reading is limited into a state in which limitation of the reading is released by executing enabling of the USB storage class driver and then controls the reading step to change a state in which limitation of the reading is released into a state in which the reading is limited by executing disabling of the USB storage class driver, and
   the controlling step controls the reading step to change a state in which the reading is limited into a state in which limitation of the reading is released by executing enabling of the USB storage class driver the disabling of which has been executed in a case where the completion notification is received.

19. The information processing method according to claim 6, wherein the information processing apparatus is connected to the storage control device via a LAN,
   the reading step is implemented by using SMB (Service Message Block), and
   the completion notification receiving step is implemented by using an event listener which is an application developed by using Winsock which is an API function.

* * * * *